Patented July 14, 1942

2,289,918

UNITED STATES PATENT OFFICE 2,289,918

MANUFACTURE OF CATALYSTS

Edward C. Lee and Jacob Elston Ahlberg, Chicago, Ill., assignors to Universal Oil Products Company, Chicago, Ill., a corporation of Delaware No Drawing. Application October 31, 1938, Serial No. 238,074

4 Claims. (Cl. 252—254)

This invention relates particularly to the manufacture of catalysts suitable for accelerating reactions among hydrocarbons.

More specifically it has reference to a method for manufacturing refractory catalytic materials which are particularly effective in selectively promoting the formation of gasoline boiling range liquids from relatively heavy petroleum fractions.

The art of pyrolytically cracking relatively heavy hydrocarbons to produce primarily gasoline or gas is very extensive and it is recognized that most of the basic principles of hydrocarbon decomposition are known and that particular commercial processes have been developed which embody these principles. The application of catalysts, however, in cracking reactions is practically upon the same basis as it is in other fields, that is, it is largely empirical. A considerable number of catalysts tried out in cracking have a tendency to accelerate reactions leading to the formation of gas rather than gasoline, this being particularly evidenced by reduced metal catalysts, such as nickel or iron, and many of such catalysts are sensitive to sulfur poisoning and are quickly coated with carbonaceous materials which render them practically inert. This deposition of carbonaceous materials is frequently related to the type of decomposition reactions selectively fostered by the catalyst.

The present invention is concerned with the manufacture of catalytic materials which are specially adapted to accelerate the cracking of heavy fractions of petroleum and other hydrocarbonaceous materials to increase the rate of production of high antiknock gasoline boiling range fractions and gaseous by-products which contain unusually high percentages of readily polymerizable olefins which are a potential source of further gasoline yields. The preferred catalysts are characterized by selectivity in accelerating gasoline-forming reactions rather than light gas-forming reactions, by their selectivity in producing high antiknock gasoline, by their refractory character which enables them to retain their catalytic properties under severe conditions of temperature and pressure, by their ease and simplicity of manufacture and their exact reproducibility.

In one specific embodiment the present invention comprises the manufacture of catalysts suitable for use in hydrocarbon conversion reactions, more particularly the conversion of hydrocarbon fractions containing substantially no gasoline into substantial yields of gasoline of high antiknock value and gases containing relatively high percentages of readily polymerizable olefins by preparing in the primary step a mixture of hydrated zirconia and hydrated silica to form hydrated zirconia-silica masses of varying zirconia-silica ratios, and subsequently treating and washing the composite masses to effect substantially complete removal of alkali metal ions therefrom, then drying to remove a major portion of the water content, forming into particles of definite sizes and calcining the purified catalytic material.

We have found that zirconia-silica catalysts which may be prepared by several alternate methods in the primary step of our process and described in more detail in the succeeding paragraphs, are rendered much more stable over long periods of use, and also more active and selective in accelerating gasoline-forming reactions in cracking when the originally precipitated hydrated zirconia and hydrated silica which go to form the primary composites in various proportions are substantially freed from alkali metal ions which in the more general methods of preparation will be sodium ions inasmuch as the various sodium silicates comprise one of the more readily available raw materials for the manufacture of this type of catalyst. The primary step in the general method of preparing the catalysts which characterize the present invention may be varied somewhat and the following is a summary of some of the alternative modes of operation which may be employed:

(1) Solutions of silicon compounds, more usually alkali metal silicates and soluble zirconium salts, may be mixed under regulated conditions of acidity or basicity to jointly precipitate hydrated zirconia and hydrated silica in varying proportions.

(2) Hydrated silica and hydrated zirconia may be separately precipitated and the precipitates mixed in the wet condition. In the case of silica, a convenient method is to acidify a solution of an alkali metal silicate to precipitate a silica gel. In the case of zirconia, the desired hydroxide may be precipitated by the addition of alkaline materials generally or volatile basic precipitants, such as ammonium hydroxide, or ammonium carbonate, ammonium hydrosulfide, ammonium sulfide, or other volatile basic precipitants generally may be employed.

(3) A separately precipitated hydrated silica may be added to an aqueous solution or a zirconium salt and the hydrated zirconia precipitated in the presence of the suspended silica by the addition of alkaline materials generally or volatile basic precipitants.

(4) A separately precipitated hydrated zirconia may be suspended in a solution of an alkali metal silicate and the silica precipitated in the presence of the suspended zirconia by the addition of just the required amount of acid which is insufficient to redissolve the zirconia.

It can be seen from the above that any method of obtaining a primary mix of hydrated silica and hydrated zirconia may be employed within the scope of the present invention, although obviously the character and efficiency of the ultimately prepared zirconia-silica catalysts will vary more or less with the exact conditions of precipitation and/or mixing, purification treatment, and the ratio of zirconia to silica. For example, one preparation may furnish catalysts best suited for use in the cracking of heavy hydrocarbon fractions, another may be better adapted for use in reforming hydrocarbons substantially within the gasoline boiling point range, while still another preparation may be better adapted for still other hydrocarbon reactions.

In the catalysts thus prepared the ratio of silica to zirconia by weight may range from 1 to 1, to 10 to 1 or greater ratios may be used, active catalysts having been prepared in which the ratio is as high as 50 to 1 so that in effect the zirconia may be considered to act as a promoter of the catalytic activity of the silica. It is to be recognized that very little is known positively concerning the mechanism of promoter action in catalysts and no attempt will be made herein to offer any definite reason for the observed effect of the addition of varying amounts of zirconia to silica. There may be a joint promoter effect or it may be that the zirconia is the more active catalyst and is extensively dispersed in and on the silica in order to present a large surface.

In the case of co-precipitation carried out according to the general methods given in section 1 above, the final acidity or basicity of the aqueous menstruum in which the precipitation is carried out should correspond to a pH value of approximately 3-10 in order to obtain best results. This can be accomplished by calculating the requisite amount of acid or alkali which may be added to a certain volume of water in which the precipitation is brought about, by the simultaneous and gradual addition of more concentrated solutions of zirconium and silicon compounds, or it may be previously added to either solution in case precipitation is brought about by the mixing of two relatively dilute solutions.

An important feature of the present invention resides in the fact that catalysts of greatly increased stability and efficiency in cracking reactions are produced when there is substantially complete exclusion of alkali metal ions from the hydrated zirconia-silica masses prior to their drying and calcining to prepare them for service. It is not known positively whether the alkali metal compounds, such as those of sodium, are present in the primary hydrated composites in chemical combination or in an adsorbed state, but it has been definitely determined that their exclusion or removal is necessary if catalysts of superior activity and stability are to be obtained. It may be considered that the presence of these alkali metal ions may cause a sintering or fusion of the surfaces of the primary composites of the catalytic material at elevated temperatures so that the porosity of the catalyst particles is reduced or altered with a corresponding reduction in effective surface, considering the catalytic effects to be due at least in part to surface action. However, such concepts are principally speculative in view of the difficulty of obtaining direct confirmatory evidence.

Several alternative methods are applicable to different primary hydrated silica-hydrated zirconia composites to insure the substantially complete absence of sodium or other alkali metal ions. One method consists in treating and washing the primary hydrated silica-hydrated zirconia precipitates or composites with regulated quantities of acidic solutions to extract alkali metal compounds incorporated into the composite catalytic materials during preparation by the formation of corresponding alkali metal salts and possibly introducing hydrogen ions into the catalyst composites. Thus a precipitated hydrated silica-hydrated zirconia mass may be first washed with water to remove the major portion of the soluble impurities and subsequently treated with relatively dilute hydrochloric acid, for example, and water to remove the alkali metal ions. As an alternative purification method, the primary composites may be treated with ammonium compounds or salts, such as ammonium chloride in solution or other ammonium halides, the sulfate, the nitrate, or the acetate so that alkali metal ions will not be substantially present in the composite when the composite preparation has been suitably washed. Whether the alkali metal ions are present in the hydrated zirconia-hydrated silica mixture in a chemically combined or adsorbed condition, the alkali metal ion may be replaced by the ammonium ions which will be later expelled from combination or adsorption in subsequent treatment at elevated temperatures. As a variation of this method the co-precipitation of the primary hydrated silica and hydrated zirconia may be brought about in the presence of ammonium hydroxide, or any of the other salts of ammonium already mentioned, in sufficient excess to insure an adequate removal of the alkali metal ions. In the case of co-precipitation, when using alkali metal silicates it has been found when admixing larger amounts of zirconia that the necessary excess of ammonia is present at the point corresponding to the presence of a gel structure of the primary precipitate which permits ready filtering and washing. In other words, if sufficient ammonia has been used to insure easy washing and filtering, the alkali metal ions have been generally removed to a degree at which they no longer have any appreciable adverse influence on the catalyst properties. In these methods of preparing the primary composite and in subsequent methods given below, it will be apparent that the purifying treatment may be introduced in the presence of the original reacting materials, or subsequent to the removal of soluble salts by preliminary treatment as, for example, by filtering and water washing.

The weight of evidence at hand on the mechanism leading to the replacement of alkali metals in the primary hydrated silica-hydrated zirconia masses indicates that the alkali metals are held by adsorption rather than by chemical bonds. This is indicated by the fact that the alkali metal ions are replaceable by ammonium or multivalent positive ions which are known in general to be more strongly adsorbed than alkali metal ions. This differentiates this replacement from the base exchange that occurs in the case of zeolites.

Another alternate method of removing alkali metal ions from precipitated hydrated silica-hydrated zirconia composites consists in treating such composites with salts of metals which may replace the sodium or other alkali metals in the manner similar to that described in the case of ammonium compounds. For example, a primary composite having large amounts of alkali metal compounds present, also a primary composite containing undesirably large amounts of adsorbed alkali metal ions even after thorough water washing may be treated with a solution of salts of multivalent metals, more particularly zirconium, in which the metal forms the positive ion of the salt being used. In this mode of operation the multivalent metal used to replace the adsorbed alkali metal ions is introduced into the catalytic material and is not removed at elevated temperatures as is the ammonium above described. Whatsoever the purification method used, catalysts suitable for hydrocarbon cracking reactions may be obtained by the use of all the methods above described.

The purification methods which have been given above have been illustrated in some cases in connection with preparations of the primary hydrated zirconia-hydrated silica according to sections 1 and 2 noted above. Alternately according to variations of sections 3 and 4, the separately precipitated hydrated silica may be added to a zirconium salt solution and the hydrated zirconia deposited with or without heating by the hydrolysis of the zirconium salt. Also, hydrated zirconia precipitated, for example, from a zirconium salt solution may be added to sodium silicate solution and the silica gel precipitated in the presence of the suspended hydrated zirconia. Whatsoever the method of preparation of the primary composite mass, the purifying method above described is applicable in replacing and removing the undesirable alkali metal impurities.

After the final washing of a hydrated zirconia-hydrated silica mixture, it may be recovered as a filter cake and dried at a temperature of the order of 240-330° F., more or less, after which it may be pressed and sized to recover particles of a convenient average size or formed into desired shapes by compression methods. It has been found that after the usual drying treatment the material usually has a total water content of approximately 15 per cent which appears to correspond to the best workability of the material. By calcining the particles at temperatures of the order of 850-1000° F. or higher, maximum activity of the catalyst is obtained and a further dehydration occurs so that, for example, after a period of heating at 900° F. the water content as determined by analysis is of the order of 2 to 3 per cent which does not vary appreciably either as the result of long service or a large number of reactivations at considerably higher temperatures.

Catalysts prepared by the above general procedure evidently possess a large total contact surface corresponding to a high porosity, the pores being of such size that hydrocarbon oil vapors are able to penetrate to a considerable distance and yet not so small that when the pores become clogged with carbonaceous deposits after a long period of service, they are difficult to reactivate by oxidation. This structure is also retained after many alternate periods of use and reactivation as evidenced by the fact that the catalyts may be repeatedly reactivated by passing air or other oxidizing gas over the spent particles to burn off deposits of carbonaceous material at temperatures as high as 1400 to 1600° F. without material loss of catalytic activity.

According to the present process catalysts prepared by the general procedure described in the preceding paragraphs are utilized to advantage in cracking reactions when employed as filling material in tubes or chambers in the form of pellets or granules. In the examples given below, wherein hydrocarbon fractions readily vaporizable at moderate temperatures without extensive decomposition are employed, the average particle size is within the range of 1 to 10 mesh, which may apply either to pellets of uniform size and short cylindrical shape or to particles of irregular size and shape produced by the grinding and sizing of the partially dehydrated materials. In some types of operation the catalyst may be formed into smaller particles or into powdered particles.

The general procedure in cracking involves contacting the hot hydrocarbonaceous material with the catalyst and the subsequent fractionation steps involving separation of residuum and the further splitting up of the products into fixed gases, fractions of gasoline boiling range and heavier recycle stocks, may obviously be followed in the case of the catalysts comprised within the scope of the invention. In using these catalysts moderate temperatures, relatively low pressures and high throughputs are to be expected in comparison with the strictly thermal cracking processes in use at the present time.

The following examples of preparation of the types of catalysts peculiar to the present invention are given to indicate their novelty and utility although not for the purpose of limiting the invention in exact agreement with the data introduced.

*Example I*

In this catalyst preparation the method generally was to react a sodium silicate solution with zirconyl nitrate to form a silica-zirconia composite using an ammonium chloride solution to remove sodium ions.

Eight hundred and thirty grams of a commercial waterglass was diluted using 6 liters of water and to this was added a solution of 327 grams of $ZrO(NO_3)_2 \cdot 2H_2O$ in 1000 cc. of water. Thus at the beginning of the addition the liquid was slightly acid to blue litmus, whereas after 90% of the zirconyl nitrate had been added the liquid was neutral to blue and red litmus. After precipitation was complete the precipitated mass was filtered and the filter cake suspended in approximately 5 liters of water and then again filtered, this water washing operation being repeated several times. Subsequently the precipitated material was treated by suspending in 4½ liters of water containing 26.75 grams of ammonium chloride and 33 cc. of concentrated ammonium hydroxide for the removal of alkali metal salts. The catalytic material was then filtered and the ammonium chloride treatment repeated. Subsequently the material was washed with three 5 liter portions of water and then filtered, the filter cake being subsequently dried at approximately 300° F. The dried material was then pressed and particles of 6-10 mesh produced from the pressed material. These particles were then calcined at approximately 932 F. and disposed in a catalyst chamber for a test. A Pennsylvania gas-oil was vaporized and the vapors preheated to a temperature of 932° F. and passed through the catalyst bed at a liquid space velocity per hour of approximately 4. In a once-through operation 27.5% of 400° F. end-point gasoline was produced having an octane number of 78.3. Readily polymerizable olefin hydrocarbons of 3 and 4 carbon atoms were also produced corresponding to 4.5% by volume of the original charge. In a second pass after regeneration of the catalyst with air 28.9% gasoline was produced having an octane number of 78.2.

*Example II*

The procedure in the present example consists in adding a solution of zirconyl chloride to an aqueous solution of sodium silicate and subsequently adding ammonium hydroxide. One and one-half liters of a solution of $ZrOCl_2$, corresponding to 0.48 mole $ZrO_2$ is slowly added while agitating to one and one-half liters of sodium silicate solution ($Na_2SiO_3.9H_2O$), corresponding to 3.0 moles of $SiO_2$. An ammonium hydroxide solution is then gradually added while stirring until the liquid is alkaline to litmus. After standing for a short period the precipitated material is filtered and the filter cake slurried in 5 liters of a solution containing 14 grams of ammonium chloride and 3 cc. of concentrated ammonium hydroxide per liter. After agitation for about 15 minutes the material is again filtered and this treatment with ammonium chloride solution again repeated. Subsequent washing is carried out with six 5 liter portions of water after which the material is dried at approximately 300° F. The dried material is pressed and granules of 6-10 mesh prepared. These granules are subsequently calcined at approximately 932° F. and disposed in a catalyst chamber for a test. The catalyst in this preparation corresponds to 100 moles $SiO_2$ supporting 16 moles of $ZrO_2$.

When processing a paraffinic gas-oil over this catalyst at approximately 932° F. in a once-through operation, a yield of 25% by volume of 400° F. end-point gasoline may be produced having an octane number of 78 with a yield of readily polymerizable olefins of 3-4 carbon atoms corresponding to approximately 4% by volume of the original charge.

We claim as our invention:

1. A process for the manufacture of catalysts for use in hydrocarbon conversion reactions, which comprises concurrently precipitating hydrated zirconium oxide and hydrated silicon dioxide by the interaction of solutions of alkali metal silicate and zirconium compounds in an aqueous menstruum containing sufficient acidic or alkaline reagent to produce a final pH of 3-10, freeing the precipitated material substantially completely of alkali metal ions, then heating sufficiently to remove a major portion of the water content, forming particles of definite size, and calcining above a temperature of about 800° F.

2. A process for the manufacture of catalysts for use in hydrocarbon conversion reactions, which comprises concurrently precipitating hydrated zirconium oxide and hydrated silicon dioxide by the interaction of solutions of alkali metal silicate and zirconium compounds in an aqueous menstruum containing sufficient acidic or alkaline reagent to produce a final pH of 3-10, treating the precipitated material with a sufficient quantity of an acidic solution and water to substantially completely remove alkali metal ions, heating the treated precipitates to remove the major portion of the water content, forming particles of definite size, and calcining above a temperature of about 800° F.

3. A process for the manufacture of catalysts for use in hydrocarbon conversion reactions, which comprises concurrently precipitating hydrated zirconium oxide and hydrated silicon dioxide by the interaction of solutions of alkali metal silicate and zirconium compounds in an aqueous menstruum containing sufficient acidic or alkaline reagent to produce a final pH of 3-10, treating the precipitated material with a sufficient quantity of an ammonium compound and water to substantially completely remove alkali metal ions, heating the treated precipitates to remove a major portion of the water content, forming particles of definite size, and calcining above a temperature of about 800° F.

4. A process for the manufacture of catalysts for use in hydrocarbon conversion reactions, which comprises concurrently precipitating hydrated zirconium oxide and hydrated silicon dioxide by the interaction of solutions of alkali metal silicate and zirconium compounds in an aqueous menstruum containing sufficient acidic or alkaline reagent to produce a final pH of 3-10, treating the precipitated material with a sufficient quantity of a salt of a multivalent metal and water to substantially completely remove alkali metal ions, heating the treated precipitates to remove a major portion of the water content, forming particles of definite size, and calcining above a temperature of about 800° F.

EDWARD C. LEE.
JACOB ELSTON AHLBERG.